United States Patent
Noda et al.

(10) Patent No.: US 6,952,599 B2
(45) Date of Patent: Oct. 4, 2005

(54) FOLDING PORTABLE RADIO DEVICE

(75) Inventors: Koji Noda, Kanagawa (JP); Hideya Ichikawa, Kanagawa (JP); Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 09/961,639

(22) Filed: Sep. 24, 2001

(65) Prior Publication Data

US 2002/0037740 A1 Mar. 28, 2002

(30) Foreign Application Priority Data

Sep. 26, 2000 (JP) ..................................... P. 2000-292552

(51) Int. Cl.[7] .................................................. H04Q 7/32
(52) U.S. Cl. ................. 455/566; 455/575.1; 455/575.3; 455/550.1; 455/412.1; 455/90.3; 379/433.01; 379/433.04; 379/433.11
(58) Field of Search ................................ 455/500, 423, 455/425, 575.6, 507, 508, 551, 556.1, 556.2, 557, 90.1, 90.2, 90.3, 418, 419, 566, 550.1, 403, 412.1, 412.2, 422.1, 517, 575.3, 575.1, 420; 345/473, 169, 102, 864, 866; 379/433.01, 433.04, 433.11, 428.01, 396

(56) References Cited

U.S. PATENT DOCUMENTS 6,453,179 B1 * 9/2002 Larsen ....................... 455/566
2001/0044317 A1 * 11/2001 Prior et al. .................. 455/550

FOREIGN PATENT DOCUMENTS

| EP | 1 009 142 A2 | 6/2000 |
| GB | 2 343 324 A | 5/2000 |
| GB | 2 346 288 A | 8/2000 |

OTHER PUBLICATIONS

Patent Abstracts of Japan, Mori Haruhiko, "Portable Telephone System", Publication No. 10164192, Publication Date Jun. 19, 1998, 1 page.

* cited by examiner

*Primary Examiner*—Keith Ferguson
(74) *Attorney, Agent, or Firm*—Pearne & Gordon LLP

(57) ABSTRACT

A folding portable radio device is provided with a first display part on the inner side of a case 16 and a second display part 29 on the outer side of the case 16, and owner's name is displayed in the second display part 29 at the idle state. In order to display owner's name in the second display part 29, in case that the folding portable radio device is in a waiting state, a user operates a key operation part to input owner's name and registers owner's name by input of a function key of a key operation part assigned to registration, whereby hereinafter owner's name can be displayed in the second display part 29 in the waiting state.

5 Claims, 9 Drawing Sheets

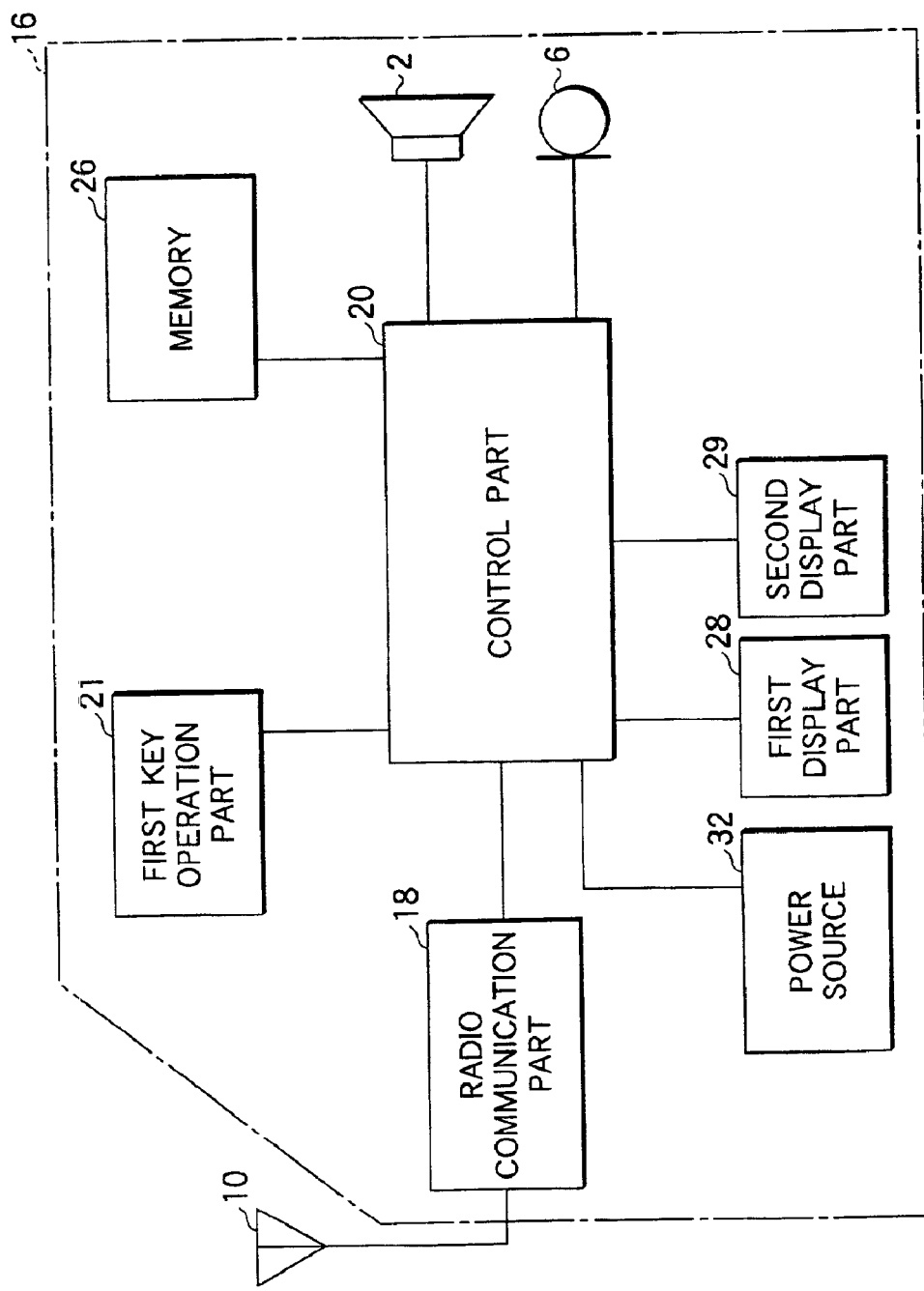

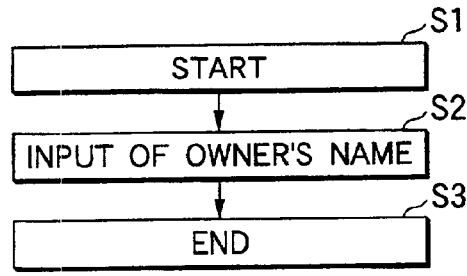
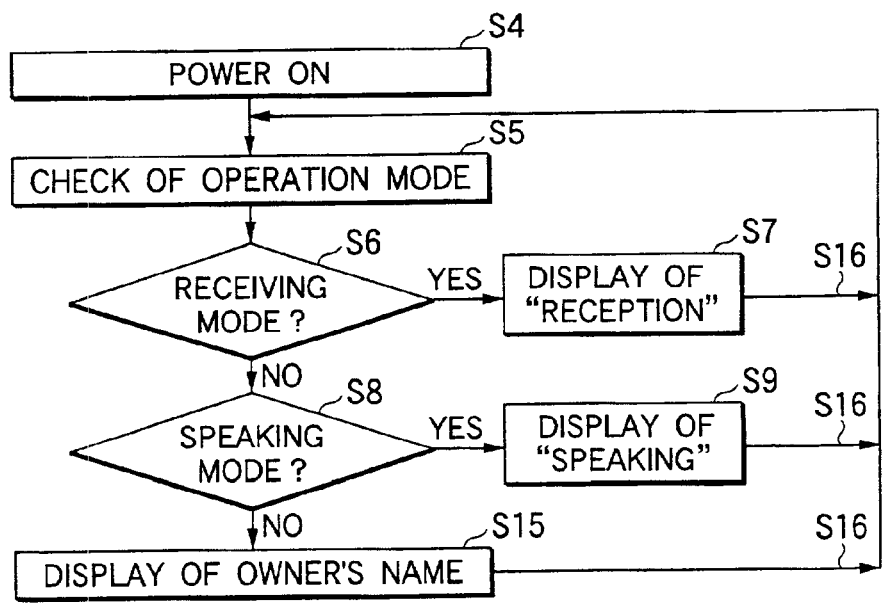
FIG.6     FIG.7     FIG.8
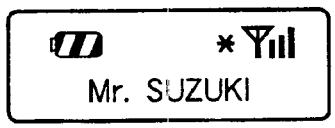
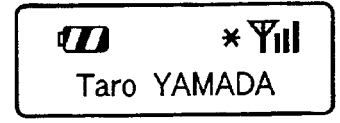
(DISPLAY OWNER'S NAME)

(DATE/TIME DISPLAY MODE)

(STATE DISPLAY MODE)

FOLDING PORTABLE RADIO DEVICE

BACKGROUND OF THE INVENTION

1. Field of the Invention

The present invention relates to a folding portable radio device in which owner's name is displayed on a liquid crystal screen.

2. Description of the Related Art

In conventional portable radio devices such as a portable telephone and the like, as a method for confirming an owner when the portable radio device is lost, a method in which owner's name stored in a memory is displayed by key operation has been proposed in Japanese Patent Laid-Open Nos. Hei 10-164192 and Hei 10-341281.

However, in a folding portable radio device, there was a problem that since a display means such as a liquid crystal hides inside in a folding state, in case that the folding portable radio device is not opened once, various data cannot be confirmed.

SUMMARY OF THE INVENTION

An object of the invention is to provide a folding portable radio device in which a second display part that can be seen from the outside in a folded state is provided on a back surface of a case of the folding portable radio device, and owner's name can be displayed in the second display part at the idle state, whereby owner's name of the folding portable radio device can be confirmed very readily in the folded state.

The invention according to the first aspect provides a folding portable radio device includes, an antenna, a radio communication part, a control part, a memory, a case, a first key operation part provided on a surface of the case, a first display part provided on the inner surface side, and a second display part provided on an outer surface of the case, wherein owner's name is displayed in the second display part during idle state, whereby owner's name of the folding portable radio device can be confirmed readily at the idle state.

The invention according to the second aspect characterizes the folding portable radio device provided by the first aspect in that the first key operation part is provided on an inner surface on a folding side of the case.

The invention according to the third aspect characterizes the folding portable radio device provided by the first aspect in that the second display part is operated by a plurality of display modes, each of the display modes is selectable with the first key operation part during an idle state, and one of the display mode is for displaying owner's name on the second display part, whereby owner's name of the folding portable radio device can be confirmed readily during the idle state.

The invention according to the fourth aspect characterizes the folding portable radio device provided by the third aspect in that the second display part includes a first region for displaying common contents to each of the display modes and a second region for displaying contents according to the display modes selected by the first key operation part, whereby owner's name of the folding portable radio device can be confirmed readily at the idle state.

The invention according to the fifth aspect characterizes the folding portable radio device provided by the first aspect in that a second key operation part is provided on an outer surface side of the case additionally, the second display part is operated by a plurality of display modes, each of the display modes is selectable with the second key operation part during an idle state, and one of the display modes is for displaying the owner's name on the second display part, whereby owner's name of the folding portable radio device can be confirmed readily at the idle state.

The invention according to the sixth aspect characterizes the folding portable radio device provided by the fifth aspect in that the second display part includes a first region for displaying common contents to each display mode and a second region for displaying contents according to the display mode selected by the second key operation part. By displaying owner's name as one of the selectable display modes, owner's name of the folding portable radio device can be confirmed readily at the idle state.

The invention according to the seventh aspect characterizes the folding portable radio device provided by the , there is provided a backlight part for lightening the second display part, the back light part is operated by the second key operation part, and the backlight part is turned on according to an operation of the second key operation part and a stateos the second display part.

The invention according to the eighth aspect characterizes the folding portable radio device provided by the seventh aspect in that the backlight part is turned on without changing display modes when the second operation key part is pushed at the first time in order to select one of the display modes during the idle state, and thereafter the display mode is successively changed by the sequential pushing operations of said second key operation part, whereby owner's name of the folding portable radio device can be confirmed readily at the idle state.

The invention according to the ninth aspect characterizes the folding portable radio device provided by the seventh aspect, when the second operation key part is pushed at the first time in order to select one of the plural display modes during the idle state, the backlight part performs like following: the backlight part is turned on for a fixed period of time without changing display modes under the situation that the backlight part had not been being turned on; and the backlight part is turned on for a longer than the above situation with changing display modes under the situation that said backlight part had been being turned on. Thereafter the display mode is successively changed by the sequential pushing operations of said second key operation part.

BRIEF DESCRIPTION OF THE DRAWINGS

FIG. 3 is a function block diagram showing the constitution of the folding portable radio device according to the first embodiment of the invention.

FIG. 4 is a flowchart for registering owner's name of the folding portable radio device according to the first embodiment of the invention.

FIG. 5 is a flowchart for displaying, at the idle state, owner's name of the folding portable radio device according to the first embodiment of the invention.

FIG. 6 is a diagram showing a display example of a second display part 29 in the folded state in case that the operation mode of the folding portable radio device according to the first embodiment of the invention is a receiving mode.

FIG. 7 is a diagram showing a display example of the second display part 29 in the folded state in case that the operation mode of the folding portable radio device according to the first embodiment of the invention is a speaking mode.

FIG. 8 is a diagram showing a display example (display of owner's name) of the second display part 29 in the folded state in case that the operation mode of the folding portable radio device according to the first embodiment of the invention is an idling mode.

DETAILED DESCRIPTION OF THE PREFERRED EMBODIMENTS

Embodiments of the invention will be described below with reference to FIGS. 1 to 15.

Figure 1A:
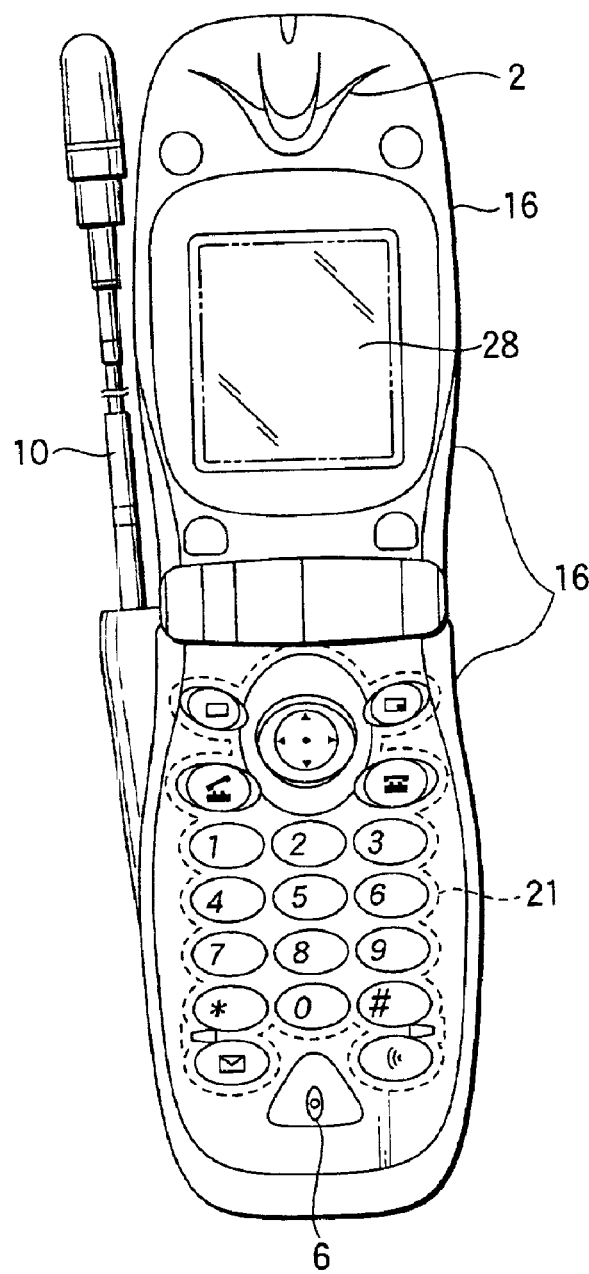
FIG. 1(a) is a front view showing a whole exterior view of a folding portable radio device according to a first embodiment of the invention.
Figure 1B:
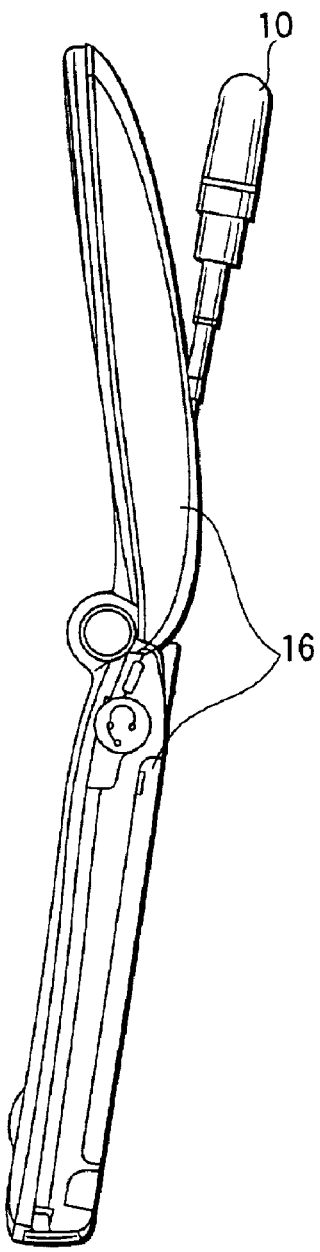
FIG. 1(b) is a side view showing a whole exterior view of the folding portable radio device according to the first embodiment of the invention.

FIGS. 1 are whole exterior views of a folding portable radio device according to a first embodiment of the invention in an opened state, in which (a) is a front view and (b) is a side view. In FIGS. 1(a), on the inner surface side of a case 16, there are a first display part 28 and a key operation part 21 including plural keys 21 (keys in a portion surrounded by dotted lines in FIGS. 1(a).

Figure 2:
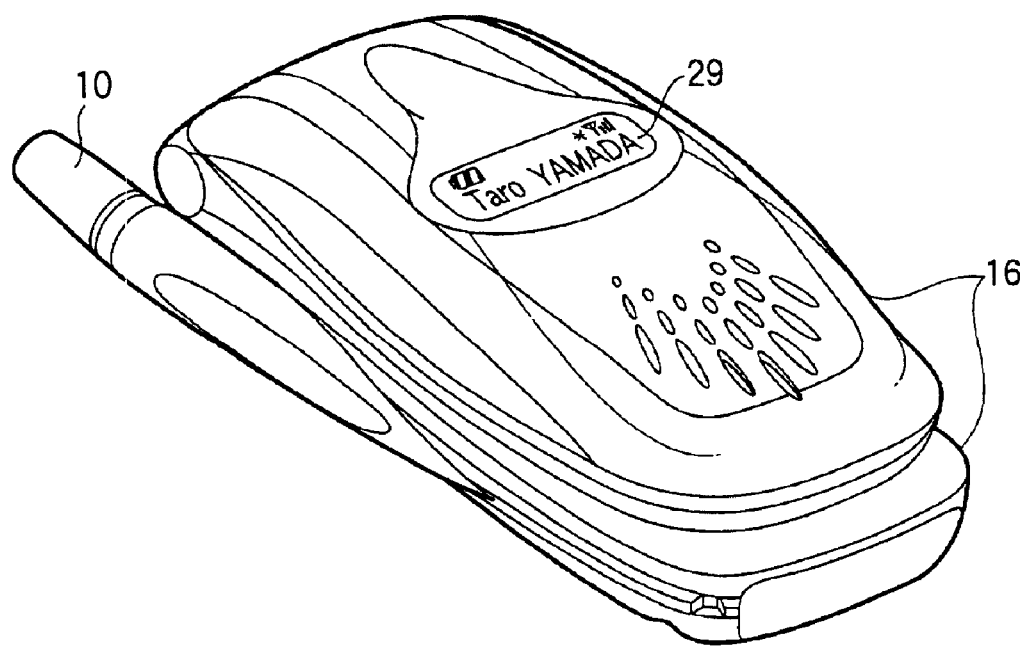
FIG. 2 is an exterior perspective view showing a folding state of the folding portable radio device according to the first embodiment of the invention.

FIG. 2 is an exterior perspective view showing a folding state of the folding portable radio device according to the first embodiment of the invention, in which a second display part 29 is provided on the outer surface side of the case 16.

FIG. 3 is a block diagram showing the constitution of the folding portable radio device according to the first embodiment of the invention. The folding portable radio device of FIG. 3 is included an antenna 10, a radio communication part 18, a control part 20, a memory 26, a case 16, a first key operation part 21 provided on the case, a first display part 28 provided on the inner surface side, a second display part 29 provided on the outer surface side of the case, a speaker 2, a transmitter 6, and a power source 32.

It is possible to place the first key operation part on anywhere of the case.

A radio wave received by the antenna 10 is then received in a receiver (not shown) of the radio communication part 18, and the received data is transmitted to the control part 20. The control part 20, according to a state where the folding portable radio device is folded or a state where it is opened, displays the received data such as a telephone number and the like in the second display part 29 in case of the folded state, and in the first display part 28 in case of the opened state. The control part 20 converts the received data into audio data and outputs the audio data from the speaker 2 of the receiver.

Further, the transmitter (microphone) 6 receives user's voice, transmits it to the control part 20, and transmits it by radio to a person on the other end of the line through a transmitter (not shown) of the radio communication part 18 and the antenna 10. The control part 20 causes the memory 26 to record the data such as a telephone number and the like, or makes the memory 26 read out the data stored therein. The first key operation part 21 comprises numeral character input keys and keys for setting various functions and selecting them, inputs signals in the control part 20 by key operation, or causes the memory 26 to store the telephone number data therein as a telephone directory through the control part 20.

Referring to a flowchart of FIG. 4, a method for registering owner's name in the above folding portable radio device will be described. When a power source of the folding portable radio device is switched on, in case of a waiting state, a user operates the first key operation part 21 and the control part 20 enters into an owner's name input state (step S1 of FIG. 4)

Next, he operates the first key operation part 21 to input owner's name, and registers owner's name by input of a function key of the key operation part 21 assigned to registration (step S2). Upon completion of registration, the control part is out of the owner's name input state and returns to the idling state (step S3).

Next, referring to FIG. 5, an operation for displaying owner's name will be described (step S4). First, a power source of the folding portable radio device is switched on. Next, in a step S5, the control part 20 enters into a check operation of the present operation mode of the folding portable radio device. In a step S6, whether the operation mode is a receiving mode or not is checked. In case of YES, in a step S7, a telephone number in case that the telephone number has been informed from a person on the other end of the line, or its telephone number and his name in case that his name has been stored previously in the memory 26 are displayed in the first display part 28 in case that the folding portable radio device is opened, or in the second display part 29 in case that it is closed. An example of the display in case that the folding portable radio device is closed is shown in FIG. 6.

In case of NO, in a step S8, whether the operation mode is a speaking mode or not is checked. In case of YES, in a step S9, the speaking mode is displayed in the first display part 28 in case that the folding portable radio device is opened, or in the second display part 29 in case that it is closed. A display example in case that the folding portable radio device is closed is shown in FIG. 7.

In case of NO, in a step S15, owner's name set by the flowchart of FIG. 4 is displayed in the first display part 28 in case that the folding portable radio device is opened, or in the second display part 29 in case that it is closed. A display example in case that the folding portable radio device is closed is shown in FIG. 8, and its exterior view is shown in FIG. 2. The control part 20, after instructing the respective display in the steps S7, S9 and S15, returns through a step S16 to the step S5, and enters into the check operation of the next operation mode.

As described above, according to the first embodiment of the invention, since owner's name is displayed on the liquid crystal screen of the second display part 29 of the folding portable radio device at the idle state, the owner of the folding portable radio device can be readily confirmed.

Second Embodiment

A whole exterior view (FIG. 1), an exterior perspective view (FIG. 2) showing a folding state, and a function block diagram (FIG. 3), which were used in the description of the first embodiment, are the same also in a second embodiment of the invention. However, in the second embodiment, a first operation part 22 is substitutive for the first key operation part 21 in the whole exterior view (FIG. 1). The first key operation part 22 is placed on a folding side of the case.

Regarding operations of the folding portable radio device according to the second embodiment, only points different from the operations in the first embodiment will be described below.

Since a method for registering owner's name in the above folding portable radio device is the same as that described with reference to FIG. 4 in the first embodiment, its description is omitted.

Figure 9:
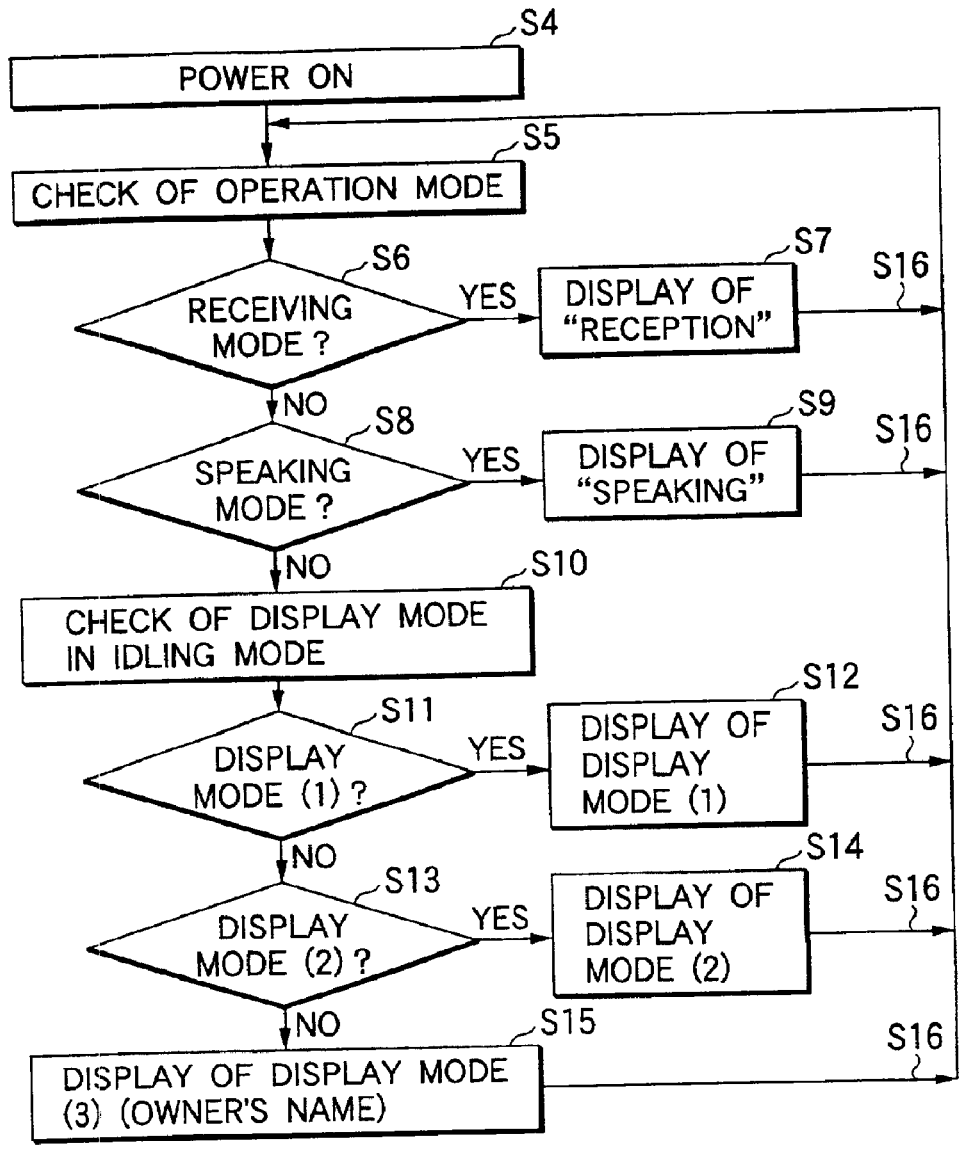
FIG. 9 is a flowchart for displaying, at the idle state, owner's name of a folding portable radio device according to a second embodiment of the invention.

Next, an operation for displaying owner's name will be described with reference to FIG. 9. First, a power source of the folding portable radio device is switched on (step S4). Next, in a step S5, the control part 20 enters into a check operation of the present operation mode of the folding portable radio device. Since steps S6 to S9 are the same as those described with reference to FIG. 5 in the first embodiment, their description is omitted.

In case of NO in a step 8, in a step S10, the control part enters into a mode for checking plural display modes in a waiting mode. In the display modes during wait, there are the following three modes. The user pushes the key operation part 22 by the predetermined operation during the waiting operation, whereby these three modes can be switched in turn. Therefore, the user can select one of these modes according to his desire.
(1) date/time display mode
(2) state display mode
(3) owner's name display mode An operation mode (1) is a mode for displaying date and time, and an operation mode (2) is a mode for displaying the state of various functions set in the folding portable radio device at the present time. An operation mode (3) is a mode for displaying owner's name, and a mode for displaying owner's name set in FIG. 4. Regarding (1) date/time display mode and (2) state display mode, display items, contents and the like are previously recorded in the memory 26.

In case of NO, in a step S13, whether the mode is a display mode (2) or not is checked. In case of YES, in a step S14, the display mode (2) is displayed in the first display part 28 in case that the folding portable radio device is opened, or in the second display part 29 in case that it is closed. The display in case that the folding portable radio device is closed is shown in FIG. 11.

In case of NO, in a step S15, the display mode (3), that is, owner's name set by the flowchart of FIG. 4 is displayed in the first display part 28 in case that the folding portable radio device is opened, or in the second display part 29 in case that it is closed. An example of the display in case that the folding portable radio device is closed is shown in FIG. 18, and its exterior view is shown in FIG. 2.

The control part 20, after instructing the respective display in the steps S7, S9, S12, S14 and S15, returns through a step S16 to the step S5, and enters into a check operation of the next operation mode.

Figure 10:
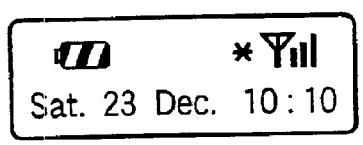
FIG. 10 is a diagram showing a display example (display mode (1)) of a second display part 29 in the folded state in case that the operation mode of the folding portable radio device according to the second embodiment of the invention is an idling mode.
Figure 11:
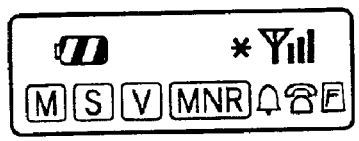
FIG. 11 is a diagram showing a display example (display mode (2)) of the second display part 29 in the folded state in case that the operation mode of the folding portable radio device according to the second embodiment of the invention is an idling mode.

As shown in FIGS. 8, 10 and 11, in case of any of (1) date/time display mode, (2) state display mode, and (3) owner's name display mode, the display in the second display part 29 is divided into an upper row and a lower row. In case of any display modes, in the upper row, the consumption state of a battery and the reception strength are displayed in order to inform the user of the most important data. Namely, the second display part 29 is composed of plural display regions, and characterized in that it can display a region where contents common to each display mode are displayed and a region where contents of the selected display mode are displayed in combination.

As described above, according to the second embodiment of the invention, since owner's name is displayed on the liquid crystal screen of the second display part 29 of the folding portable radio device at the idle state, the owner of the folding portable radio device can be readily confirmed.

Third Embodiment

Figure 12:
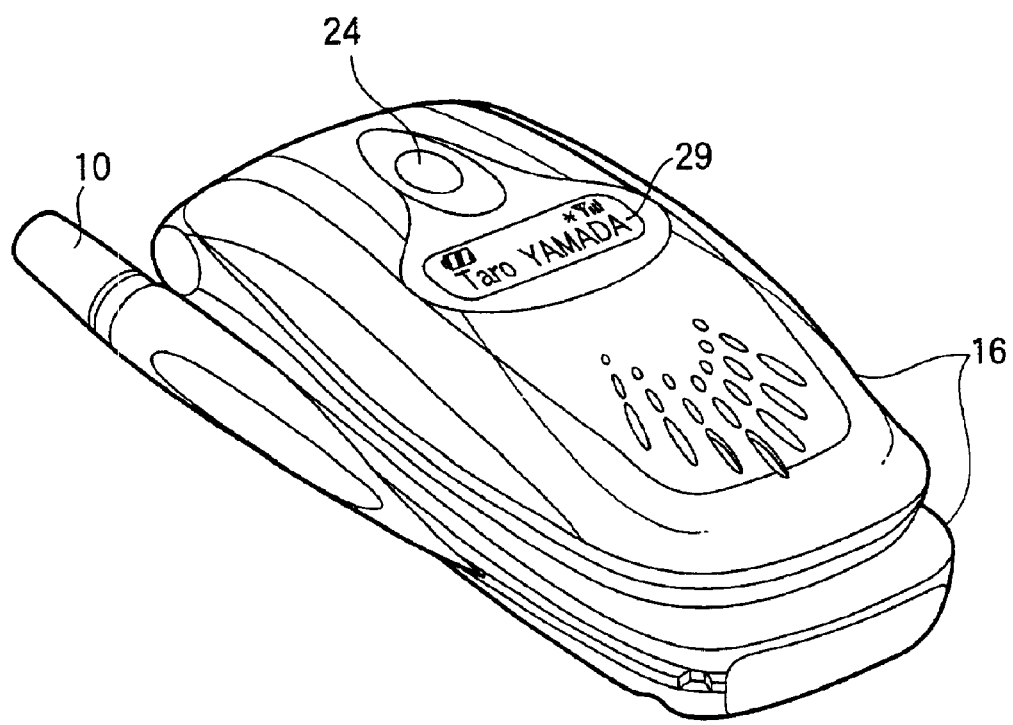
FIG. 12 is an exterior perspective view showing a folding state of a folding portable radio device according to a third embodiment of the invention.

A whole exterior view (FIG. 1), which was used in the description of the first embodiment, is the same also in the third embodiment of the invention. An exterior perspective view showing a folding state is shown in FIG. 12. This exterior perspective view is different from that of FIG. 2 in the first embodiment in only that a second key operation part 24 is provided. The function block diagram (FIG. 13) in the second embodiment is different from the function block diagram (FIG. 3) in the first embodiment in only that the first key operation part 21 in FIG. 3 becomes a first key operation part 22 and a second key operation part 24 that does not exist in FIG. 3 is added.

Regarding operations of the folding portable radio device according to the third embodiment, only points different from the operations in the second embodiment will be described below.

Since a method for registering owner's name in the above folding portable radio device is the same as that described with reference to FIG. 4 in the first embodiment, its description is omitted.

Next, an operation for displaying owner's name will be described with reference to FIG. 9 used in the second embodiment. Since steps S4 (the power source of the folding portable radio device is switched on) to S9 are the same as those described with reference to FIG. 9 in the second embodiment, their description is omitted.

In case of NO in a step 8, in a step S10, the control part enters into a mode for checking plural display modes in a waiting mode. In the display modes during wait, there are the following three modes. The user pushes the second key operation part 24 during the waiting operation, whereby these three modes can be switched in turn. Therefore, the user can select one of these modes according to his desire.

As described above, in the third embodiment, switching the plural display modes is performed not by the first key operation part 22 but by the second key operation part 24. Therefore, the display mode can be changed in a state where the folding portable radio device is folded, which is very convenient.

As described above, according to the third embodiment of the invention, since owner's name is displayed on the liquid crystal screen of the second display part 29 of the folding portable radio device at the idle state, the owner of the folding portable radio device can be readily confirmed.

Fourth Embodiment

Figure 13:
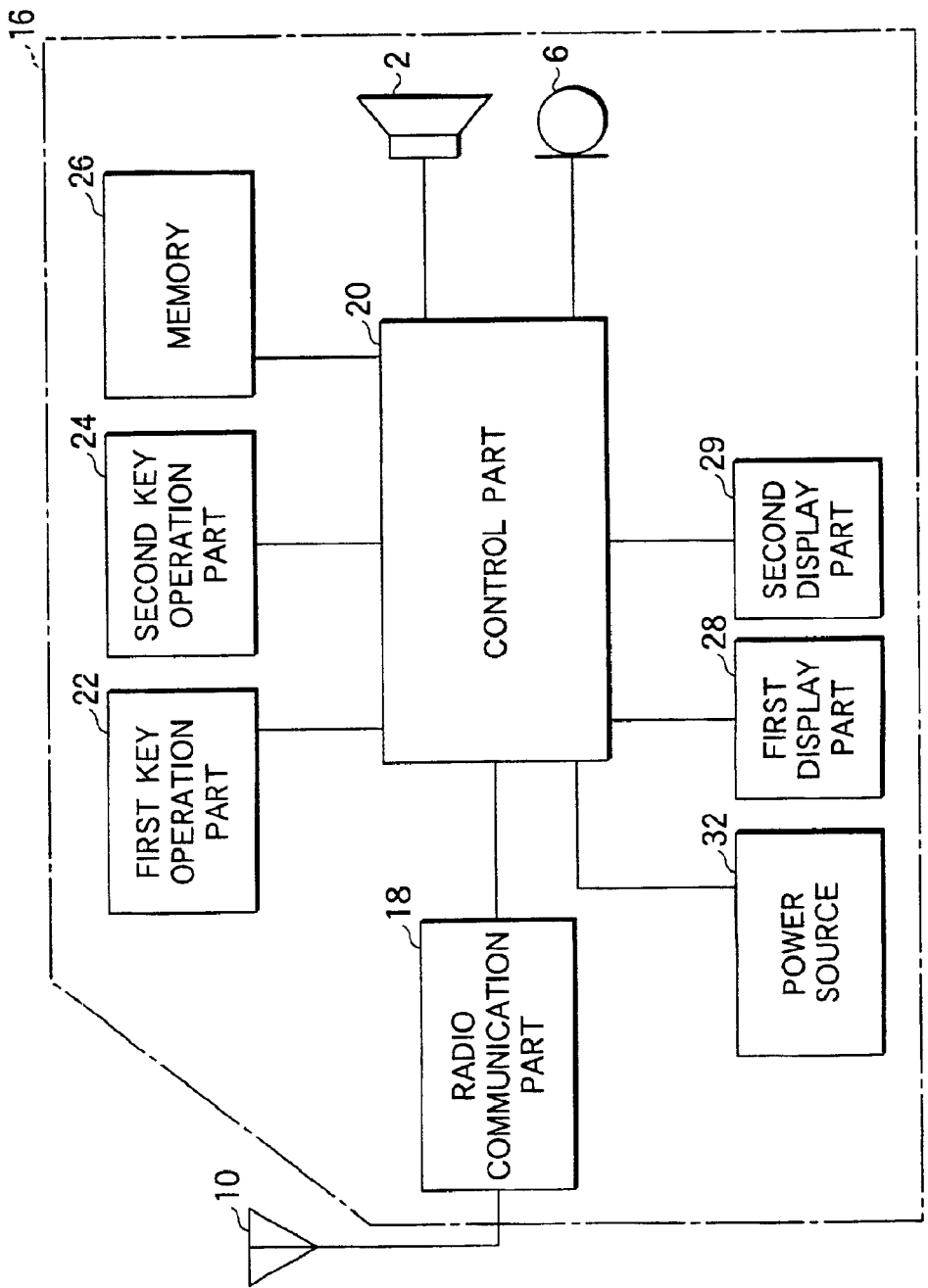
FIG. 13 is a function block diagram showing the constitution of a folding portable radio device according to the third embodiment of the invention.
Figure 14:
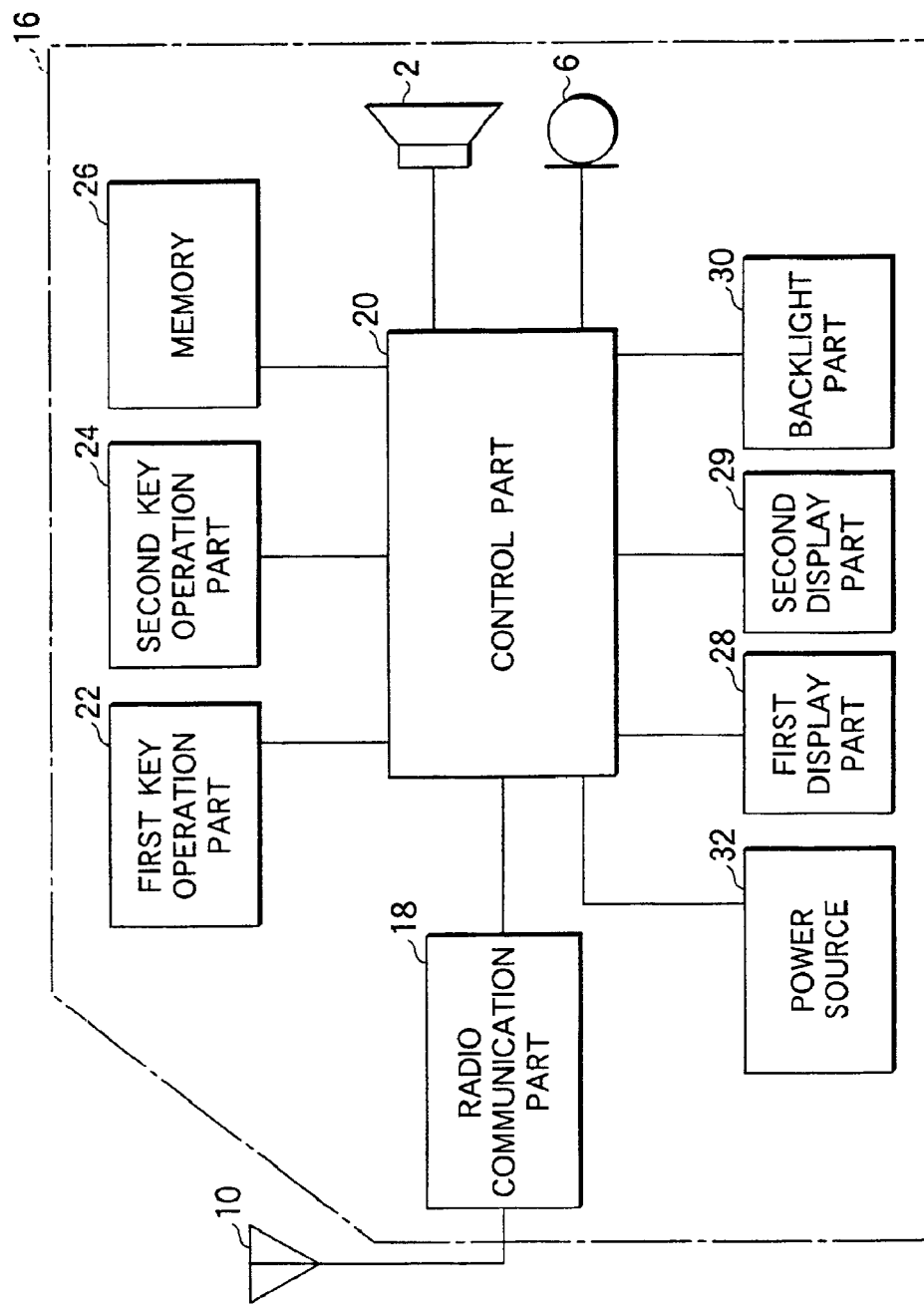
FIG. 14 is a function block diagram showing the constitution of the folding portable radio device according to a fourth embodiment of the invention.

A function block diagram of a fourth embodiment is shown in FIG. 14. A backlight part 30 that did not exist in the function block diagram of FIG. 13 is added to FIG. 14, and the control part 20 confirms that the second key operation part 24 has been pushed and lightens the second display part 29.

Figure 15:
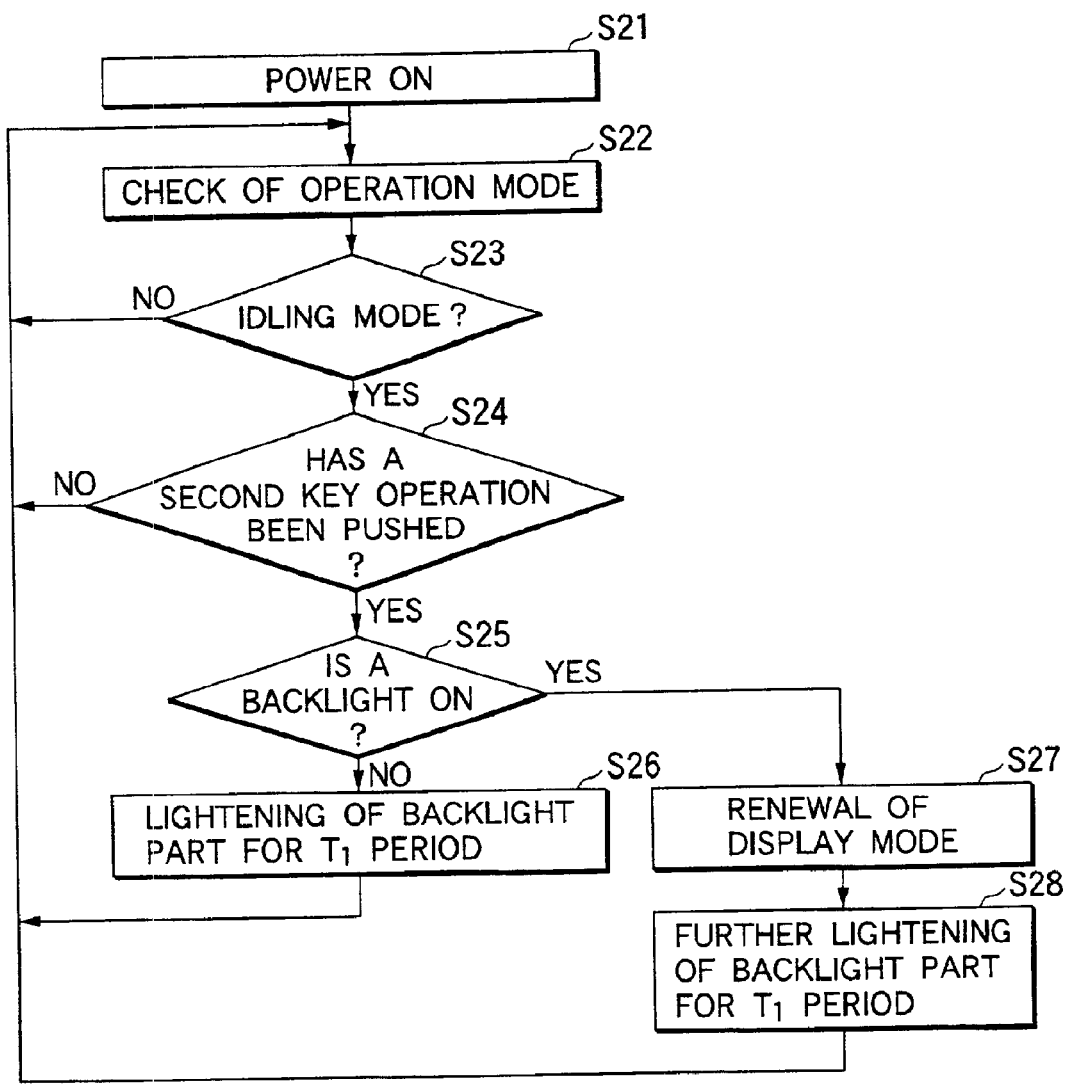
FIG. 15 is a flowchart for explaining a display mode changing operation according to the fourth embodiment of the invention.

In an operation for displaying owner's name, in case that the second key operation part 24 has been first pushed, the display mode is not changed but the second display part 29 is lightened by the backlight part 30, so that the display contents can be confirmed even at night, while only in case that the second key operation part 24 has been sequentially pushed, the display mode is changed successively. FIG. 15 is a flowchart for explaining the above operation more detailedly. With reference to FIG. 15, its operation will be described below.

First, a power source of the folding portable radio device is switched on (step S21). Next, in a step S22, the control part 20 enters into a check operation of the present operation mode of the folding portable radio device.

In a step S23, whether its operation mode is a "waiting mode" or not is checked, and in case of NO, the control part returns to the step S22. In case of YES, in a step S24, whether the second key operation part 24 has been pushed or not is checked, and in case of NO, the control part returns to the step S22. In case of YES, in a step 25, whether the backlight part 30 has been already lightened or not is checked. In case of NO, in a step S26, the control part 20 operates an inner timer, gives an instruction of lightening the backlight part 30 for a predetermined time, and returns to the step S22 (In this case, the display mode is not changed. Therefore, for example, in case that the user has pushed the second key operation part 24 in order to confirm the display mode in the dark, the display mode does not change but only the display mode can be confirmed.).

Next, in the above operation, after the steps S22, S23, S24, and S25, in case of YES, the control part renews the display mode in a step S27. Then, in a step S28, the control part 20 resets the inner timer, operates the timer again, gives an instruction of further lightening the backlight part 30 for a predetermined time, and returns to the step S22.

As described above, in the invention, in case of the waiting state, owner's name is displayed on the liquid crystal display screen that can be always seen in a state where the folding portable radio device is folded, whereby the owner can be readily confirmed. For example, even if the folding portable radio device has been forgotten on a desk, since owner's name is displayed, there is an effect that the other person that has found it is easy to look for the owner.

What is claimed is:

1. A folding portable radio device comprising:

an antenna;

a radio communication part;

a control part;

a memory;

a case;

a first key operation part provided on said case;

a first display part provided on an inner surface on a folding side of said case;

a second display part provided on an outer surface of said case; and a second key operation part provided on said outer surface side of said case, wherein said second display part is operated to display one of a plurality of display modes selected by the control part, said display modes include idle display modes, wherein a default idle display mode is selectable by said second key operation part from the idle display modes, and one of the idle display modes is for displaying an owner's name on said second display part, wherein during an idle state said control part selects the default idle display mode.

2. A folding portable radio device according to claim 1, further comprising:

wherein said second display part includes:

a first region for displaying common contents to each of the display modes; and a second region for displaying contents according to the display mode selected by said control part.

3. A folding portable radio device according to claim 1, further comprising:

a backlight part for lightening said second display, wherein said backlight part is operated by said second key operation part, and the backlight part is turned on according to an operation of said second key operation part and a state of said second display part.

4. The folding portable radio device according to claim 3, wherein said backlight part is turned on without changing display modes when said second operation key part is pushed at a first time in order to select one of the idle display modes during an idle state, and thereafter the display mode is successively changed by sequential pushing operations of said second key operation part.

5. The folding portable radio device according to claim 3, wherein said backlight part is turned on for a fixed period of time without changing display modes under a first situation in which said backlight part is off when said second operation key part is pushed at a first time in order to select one of the idle display modes during an idle state, wherein said backlight part is turned on for a period longer than that of the first situation with changing display modes under a second situation in which said backlight part is on when said second operation key part is pushed at a first time in order to select one of the idle display modes during an idle state, and thereafter the display mode is successively changed by sequential pushing operations of said second key operation part.

* * * * *

UNITED STATES PATENT AND TRADEMARK OFFICE
CERTIFICATE OF CORRECTION

| | | |
|---|---|---|
| PATENT NO. | : 6,952,599 B2 | Page 1 of 1 |
| APPLICATION NO. | : 09/961639 | |
| DATED | : October 4, 2005 | |
| INVENTOR(S) | : Koji Noda et al. | |

It is certified that error appears in the above-identified patent and that said Letters Patent is hereby corrected as shown below:

On Title Page, Col. 2, Item (56), References Cited, U.S. Patent Documents, please add the following:

| | | |
|---|---|---|
| --6,574,487 | 6/2003 | Smith et al.-- |
| --6,449,498 | 9/2002 | Kirbas et al.-- |
| --5,870,683 | 2/1999 | Wells et al.-- |
| --6,125,286 | 9/2000 | Jahagirdar et al.-- |
| --5,841,855 | 11/1998 | Davidson et al.-- |

On Title Page, Col. 2, Item (56), References Cited, Foreign Patent Documents, please add the following:

| | | |
|---|---|---|
| --JP | 10-341381 | 12/1998-- |
| --JP | 10-164192 | 6/1998-- | column 8, line 12, please delete "default", and insert therefor --user selected--.

column 8, line 17, please delete "default", and insert therefor --user selected--.

Signed and Sealed this

Twenty-second Day of August, 2006

JON W. DUDAS
*Director of the United States Patent and Trademark Office*